UNITED STATES PATENT OFFICE.

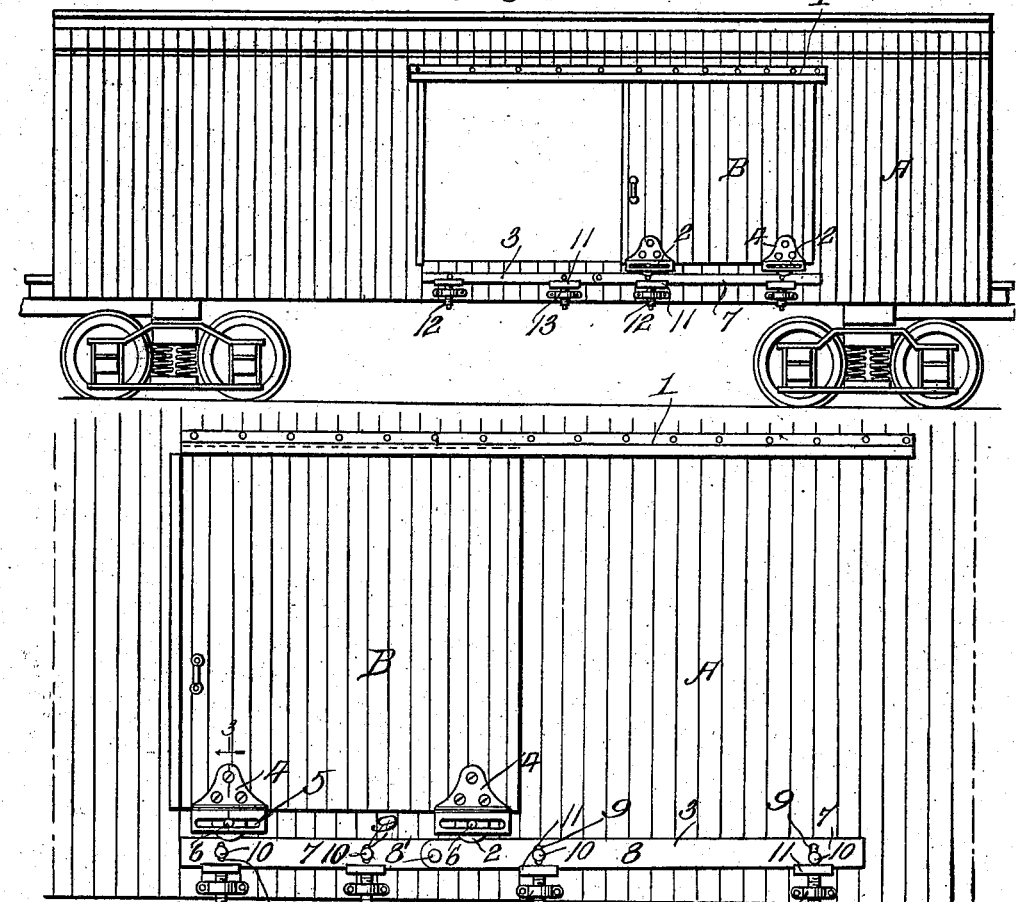

JAMES P. WILLIAMS, OF NEW ORLEANS, LOUISIANA.

COMBINED TRACK AND ROLLER SUPPORT FOR FREIGHT-CAR DOORS.

No. 881,756.  Specification of Letters Patent.  Patented March 10, 1908.

Application filed May 16, 1907. Serial No. 374,093.

*To all whom it may concern:*

Be it known that I, JAMES P. WILLIAMS, a citizen of the United States, residing at New Orleans, in the parish of Orleans and State of Louisiana, have invented new and useful Improvements in a Combined Track and Roller Support for Freight-Car Doors, of which the following is a specification.

This invention relates to a door for freight, stock and similar cars, whereby the door can be firmly locked in closed position and is designed to do away with the destructive practice of securing the door in closed position by nailing cleats on the door and side of the car, a practice which is extremely expensive and inconvenient and often necessitates repair of the car doors.

The invention has for one of its objects to provide a comparatively simple, inexpensive and substantial means for clamping a door in closed position and which is comparatively easy and convenient to operate.

A further object of the invention is the employment of a bottom track rail on which the car door moves, and which is composed of sections arranged in such a manner that at least one of them can be tilted so that the door is incapable of passing thereover.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a side elevation of a freight car of the ordinary box type, and showing the side door in open position. Fig. 2 is an enlarged side view of the middle portion of the car showing the door in closed position. Fig. 3 is an enlarged vertical transverse section on line 3—3, Fig. 2. Fig. 4 is an enlarged detail view of one of the rail adjusting screws.

Similar reference characters are employed to designate corresponding parts throughout the several views.

Referring to the drawing, A designates the body of a car of a box or any other approved type, and B, one of the side doors thereof. This door runs at its upper edge in a guide 1 on the side of the car in the usual manner and at the bottom of the door are provided rollers 2 for riding on the bottom track rail 3, the rollers being arranged in brackets 4 on opposite sides of the door. The brackets project downwardly beyond the bottom of the door and have horizontal slots 5 for receiving the axles 6 of the rollers. The bottom track rail 3 is preferably composed of two sections 7 and 8 arranged end to end and preferably hingedly connected at 8'. Each section has vertically extending slots 9 through which project bolts 10 that secure the sections of the rail on the car.

The rail sections 7 and 8 each rest on a pair of shoes 11 of U-shape in cross-section for receiving the bottom edge of the rail sections and these members are supported on the upper ends of adjusting screws 12 that engage in threaded brackets 13 on the sides of the car, there being a swivel joint between each screw and its rail-engaging member 11. The lower ends of the screws are squared or otherwise formed to receive a turning crank or wrench. By this means, the bottom rail 3 for the car door can be moved bodily to any desired position to hold the door properly in place. When the rail sections 7 and 8 are in perfect alinement, so that the top edge of the rail 3 is horizontal, the door B can be freely moved back and forth. Whenever it is desired to hold the door in closed position, it is merely necessary to tilt the section 8 of the rail by turning the adjusting screws 12 in such a way as to elevate the free end of the rail section 8. By this means, the door would have to move up an incline in attempting to slide open. Furthermore, the space between the outer end of the section 8 and the top rail 1 is too limited to accommodate the door, so that it would be impossible for the latter to be moved open. It will thus be seen that as long as the rail is in the position shown in Fig. 2, no unauthorized person can force the door open since it requires an operating crank to lower the rail section 8 to normal position. It is to be further understood that since the section 7 is adjustable, the car door can also be held in open position if such is desired.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what I claim is:—

1. The combination of a car body having an opening, a door-supporting track mounted on the car below the opening and having independently adjustable sections arranged end to end, one of the sections being shorter than the width of the opening and normally disposed under the same, and door-guiding means on the car above the opening, with a door supported on and movable over the track and having its top engaged by the said guiding means.

2. The combination of a car body, a rail composed of independently adjustable sections and having vertical slots, fastenings passing through the slots and secured to the car body, bearings on the car body disposed under the track, vertically-extending screws in the bearings, devices on which the sections of the track rest, and swiveled joints between the devices and screws, with a car door, and devices attached to the car door and engaging the track for movably supporting the door on the latter.

3. The combination of a car body, an edgewise movable door, anti-friction elements mounted on said door, a fixed guideway for the top edge of the door, a track under the door composed of adjustable and connected sections and on which the elements bear, bearings on the side of the car at a point below the sections, screws engaging in the bearings, members on the screws for receiving the rail sections, and swivel joints between the screws and members.

4. The combination with a car body, an edgewise movable door thereon, a track rail composed of hingedly connected sections, spaced rollers on the door and movable on the sections, and means for independently tilting both of the sections.

In testimony whereof, I affix my signature in presence of two witnesses.

JAMES P. WILLIAMS.

Witnesses:
JAS. SIMS,
L. S. HYDE.